United States Patent [19]

Kraus

[11] 4,306,754

[45] Dec. 22, 1981

[54] HYBRID HYDROSTATIC AXIAL THRUST BEARING

[76] Inventor: Charles E. Kraus, 3602 Mt. Bonnell Rd., Austin, Tex. 78731

[21] Appl. No.: 145,032

[22] Filed: Apr. 30, 1980

[51] Int. Cl.³ ............................................. F16C 32/06
[52] U.S. Cl. .......................................... 308/9; 308/35
[58] Field of Search ............... 308/9, 35, DIG. 1, 170, 308/219, 231, 122

[56] References Cited

U.S. PATENT DOCUMENTS

| | | | |
|---|---|---|---|
| 3,642,331 | 2/1972 | Silver | 308/35 |
| 3,854,781 | 12/1974 | Bildtsen | 308/35 |
| 3,910,650 | 10/1975 | Krans | 308/122 |
| 4,092,048 | 5/1978 | Bennett et al. | 308/35 |

Primary Examiner—Lenard A. Footland
Attorney, Agent, or Firm—Klaus J. Bach

[57] ABSTRACT

A hybrid hydrostatic axial thrust bearing has a load member supported on a support member by an anti-friction bearing and by pressurized fluid supplied to a cavity formed between the two members. Means are provided for limiting the pressure of the pressurized fluid in the cavity and for transferring any additional load of the load member to the anti-friction bearing so that the load to which the pressurized fluid system is exposed remains within given limits.

9 Claims, 3 Drawing Figures

HYBRID HYDROSTATIC AXIAL THRUST BEARING

BACKGROUND OF THE INVENTION

1. Field of the Invention

The invention relates to a hydrostatic axial thrust bearing which includes an anti-friction bearing for supporting at least part of the bearing load when the load is too large for the pressurized fluid in the bearing.

2. Description of the Prior Art

A hydrostatic axial thrust bearing consists of a support member and a load member disposed adjacent the support member with a cavity formed between the two members to which cavity pressurized fluid is supplied for supporting the load member on the support member. The pressurized fluid is generally supplied by a pump and the pump pressures normally required are about 300 to 500 psi. Such pressures do not pose any problems, not with regard to cost nor with regard to operating noise. Occasionally, however, the loads become excessive such that fluid pressures of up to 1500 psi would be required. Pumps and bearing parts adapted to carry such a load would present substantial problems and require expensive structures hardly justifiable as such excessive loads occur generally only for short periods.

Backup anti-friction bearings have been used in connection with hydrostatic axial thrust bearings such as disclosed in U.S. Pat. No. 3,910,650. These bearings are designed to take up the bearing load when the fluid pressure is not yet sufficiently high for supporting the load, particularly during start-up. During operation of such bearings, it has been discovered that high pressure hydrostatic bearings are not immune to wear especially if there is some particulate contamination in the hydrostatic bearing oil. Although such wear occurs only very slowly, in time it affects the sensitive position of the backup anti-friction bearing relative to the limited leakage sealing surfaces such that the anti-friction bearing will take up an increasing share of the bearing load which will finally result in the dumping of the pressurized fluid from the bearing load cavity.

After many years of experience with such transmissions particularly in connection with infinitely variable traction roller transmissions especially for use in vehicles where the loads and speeds to which the bearings are subjected fluctuate within a wide range, the present inventor is able to specify requirements for a hybrid bearing, that is a hydrostatic axial thrust bearing including a backup anti-friction bearing as follows: During startup or loss of fluid pressure the anti-friction bearing must be capable of carrying the load. Normally, that is with pressurized fluid available, the hydrostatic bearing should carry most or all of the load until a maximum pressure is reached whose value is determined by design or by adjustment. Note that the hydrostatic bearing pressure is a function of the bearing load. Above a desirable limit, that is when maximum pressure is reached, the anti-friction bearing should take up any additional load. Wear on the hydrostatic bearing and seal surfaces should not affect the distribution of the load, that is wear should not affect the operation of the bearing.

SUMMARY OF THE INVENTION

A hybrid hydrostatic axial thrust bearing has a load member supported on a support member by an anti-friction bearing and/or by pressurized fluid supplied to a cavity formed between the two members. Whenever the pressure of the fluid in the cavity is not sufficient to support the load member, the anti-friction bearing shares in supporting the load. Means are provided for limiting the pressure of the fluid in the load cavity and for transferring any additional load of the load member to the anti-friction bearing such that the hydraulic system is exposed to loads only within the given limits. The hydraulic system including the pressurized fluid supply source therefore needs to be designed only for pressures within the given limits. Load peaks however occur only rarely and only for short periods of time so that the anti-friction bearing is subjected to relatively little use. The bearing accordingly may be small and inexpensive but, nevertheless, has a long survive life.

DESCRIPTION OF PREFERRED EMBODIMENTS

Figure 1:
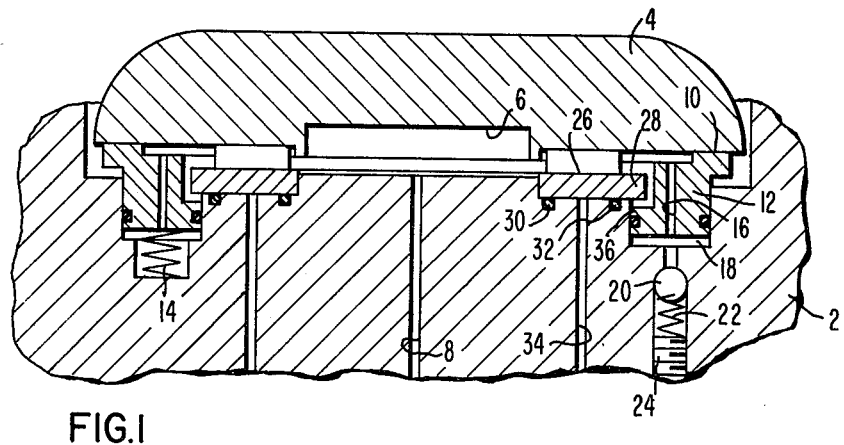
FIGS. 1 and 2 each show a hydrostatic axial thrust bearing including an anti-friction bearing for taking up at least some of the bearing load under certain load conditions.

FIG. 1 shows a hydrostatic axial thrust bearing in which a support member 2 supports a load member 4 by a bearing structure disposed between the support and load members 2 and 4. The load member 4 has a cavity 6 formed therein into which pressurized fluid is admitted through a pressurized fluid passage 8, which may be arranged in either the support or the load member. Escape of pressurized fluid from the load cavity 6 is normally permitted only through the limited leakage seal passage 10 formed between surfaces of the load member 4 and a limited leakage seal ring 12 which is movably disposed in, and sealed against the walls of, the cavity 6. The seal ring 12 contains the pressurized fluid under pressure within the load cavity 6 and the pressurized fluid normally carries the full load of the load member 4. The limited leakage seal ring 12 is preferably biased by springs 14 toward the load member 4 in order to readily permit pressurization of the load cavity during start-up. It is provided with an orifice 16 permitting pressurized fluid to flow into the space 18 behind the seal ring so as to balance the pressure of the leakage fluid in the limited leakage fluid path between the seal ring 12 and the load member 4. The seal ring has its opposite faces so sized that upon pressurization of the load cavity, its distance from the load member 4 is automatically adjusted to provide only a small gap for a small leakage flow. In order to prevent overpressurization of the cavity and over-loading of the pressurized fluid source as it may be caused by overloads of the axial thrust bearing, there is provided a pressure relief valve 20 which opens when a predetermined pressure is reached; that is when the bearing load reaches a predetermined value. The relief pressure is adjustable by changing the force of spring 22 by means of an adjustment screw 24. Within the bearing cavity 6 there is further provided an anti-friction bearing 26 having an annular race 28 supported on the support member 2. Two O-rings 30 and 32 are disposed below the race 28 and a vent passage 34 provides communication between the area under the race 28 and a low pressure area to prevent undesired floating of the annular race 28 when the load member is supported solely by the pressurized fluid in the cavity 6.

Under light load, the load member 4 is raised off the support member and the limited leakage seal ring 12 follows the movement of the load member 4. The limited leakage seal ring 12, however, is provided with a flange 36 projecting radially inwardly under the annular race 28 which thereby restricts the movement of the leakage seal ring 12. This, at the same time, restricts lift-off of the load member 4 as further raising of the load member results in an increased leakage gap 10 and increased leakage rates which would limit the pressure of the pressurized fluid in the load cavity to the value needed to carry the load.

If, on the other hand, the load member increases beyond the predetermined value the fluid pressure is not permitted to rise beyond the predetermined value; rather the relief valve 20 is opened so that pressurized fluid is discharged from the load cavity and the load member settles down onto the anti-friction bearing 26. The fluid pressure in the load cavity remains at the limit providing for a predetermined maximum load member support force. Any excess load is taken up by the anti-friction bearing.

Such excessive load conditions however, do not occur frequently. Most of the time the bearing load is well below the predetermined limit value. The antifriction bearing is therefore used only quite infrequently, that is during start-up until sufficient fluid pressure is available and during peak loads. Since the hydraulic load is limited to a given value, the pumps and fluid need to be designed only for the given limit and not for the load peaks.

Figure 2:
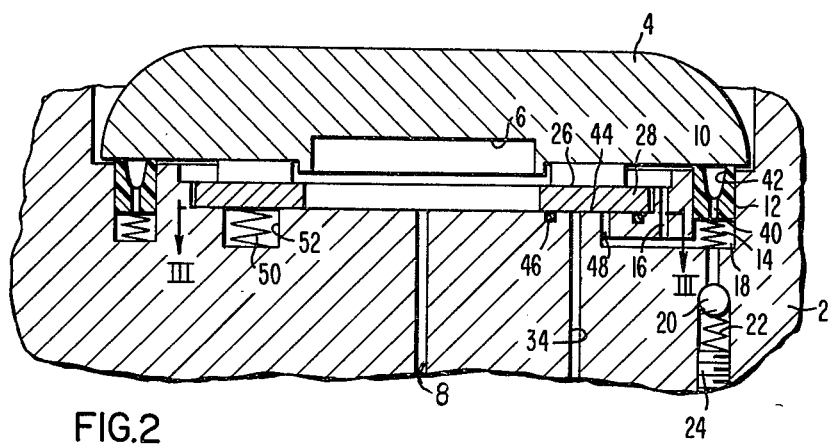

FIG. 2 shows an embodiment of the present invention which is similar to the arrangement of FIG. 1 and which operates in a similar manner. Functionally identical parts are therefore identified by the same numerals and are not described in detail.

In the arrangement of FIG. 2, axial movement of the limited leakage seal ring 10 is not limited. It will therefore follow the movement of the load member 4 under the pressure of the fluid supplied to the cavity 18 behind the seal ring 12. The seal ring 12 is further provided with a passage 40 which supplies pressurized fluid to a groove 42 which is formed in the face of the seal ring 12 to assure lift-off particularly during start-up. Wear of the face of the seal ring does not affect its operation since it is allowed to follow the load member. Accordingly, it cannot control the discharge of pressurized fluid from the load cavity under normal load operating conditions. This control is rather achieved by a floating suspension for the bearing race 28. There is provided under the race 28 a sealed low pressure area 44 defined by O-rings 46, which areas are in communication with low pressure fluid (pump suction) through discharge line 34. The low pressure area 44 is further in communication with the load cavity 6 through a pressurized fluid discharge passage 48 and orifice passage 16; however, passages 34 and 48 are closed when the bearing race is seated, that is when the anti-friction bearing supports part of the load. Under normal operating conditions when the pressurized fluid carries the full bearing load and the load member is slightly raised the race 28 will also be raised off its seat by springs 50 arranged in cavities 52 adjacent the race 28. This will provide for communication between discharge passage 48 and discharge line 34 through the low pressure area 44 causing discharge of pressurized fluid from the load cavity 6. The race 28 and the load member 4 will be raised only slightly, however sufficiently to take the load off the anti-friction bearing 26.

Figure 3:
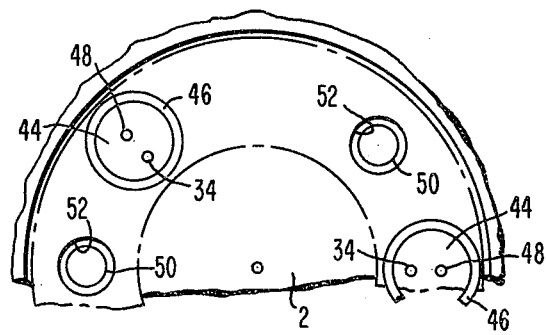
FIG. 3 is a top view of an area below the race of the anti-friction bearing, that is a view along lines III—III of FIG. 2.

FIG. 3 is a sectional view along line III—III of FIG. 2. It shows in greater detail a portion of the bearing race 28 with the sealed low pressure area 44 underneath. The O-ring 46 is preferably so selected that it permits the race 28 to be raised as high as 0.01 inches without appreciable leakage of fluid past the O-ring into the sealed area 44.

This arrangement operates as a valve controlling the amount by which the load member may be raised during normal operation until the load exceeds a predetermined value corresponding to a predetermined fluid pressure at which the relief valve 20 opens. At this point the race 28 settles down and closes discharge passage 48 and discharge line 34. Any additional bearing load is then taken up by the anti-friction bearing 26.

A bearing structure in accordance with the present invention is relatively small and the hydraulic support system needs to be designed only for predetermined limited hydrostatic bearing loads. Therefore, it is usually possible to use a hydrostatic fluid pressure source which is usually available in connection with transmissions.

The invention is, of course, not limited to the arrangements described. It is, for example, possible to limit movement of the hydrostatic bearing seal ring by means other than the anti-friction bearing race. A stop member could be provided at the outer circumference of the seal ring and the position of such stop member could even be adjustable from the outside.

I claim:

1. A hybrid hydrostatic axial thrust bearing comprising: a support member; a rotatable load member disposed opposite said support member, said support and load members having a load cavity formed therebetween; means for admitting pressurized fluid to said load cavity; an anti-friction bearing disposed between said support and load members, said pressurized fluid and said antifriction bearing being adapted to support said load member on said support member; and means for limiting the pressure of said pressurized fluid in said load cavity so as to limit the load supported by the pressurized fluid and for transferring any additional load beyond the load limit of the pressurized fluid to said anti-friction bearing.

2. A hydrostatic axial thrust bearing as recited in claim 1, wherein said means for limiting the pressure of said pressurized fluid is a pressure relief valve in communication with the fluid in said load cavity and adapted to open and discharge fluid from said load cavity when the fluid pressure in said cavity reaches a predetermined limit.

3. A hydrostatic axial thrust bearing as recited in claim 2, wherein an axially movable seal ring is associated with said support member and has a limited leakage seal face adjacent the load member so as to form with the load member a pressurized fluid leakage path around said load cavity, said seal ring being exposed at its opposite face to the pressurized fluid in a balancing space for balancing the fluid pressure at its seal face side, said balancing space being in communication with the load cavity through an orifice passage and said relief valve being associated with the balancing space to release pressurized fluid therefrom when the fluid pressure exceeds said predetermined limit.

4. A hydrostatic axial thrust bearing as recited in claim 3, wherein means are provided for limiting axial lift-off movement of said axially movable seal ring so as to limit lifting of said load member during normal load operations.

5. A hydrostatic axial thrust bearing as recited in claim 4, wherein said anti-friction bearing has a race supported on said support member within said seal ring and said seal ring has a ledge projecting behind said race, said race forming a stop for said seal ring to limit the lifting of said load member.

6. A hydrostatic axial thrust bearing as recited in claim 5, wherein said race is supported on said support member by two concentric O-rings and the space between the O-rings is in communication with a low pressure area so as to hold the race in engagement with the support member.

7. A hydrostatic axial thrust bearing as recited in claim 4, wherein said anti-friction bearing has a race floatingly supported on said support member and having at its seat sealed valving areas providing for communication between said load cavity and a low pressure area when said race is raised during normal operation of said bearing.

8. A hydrostatic axial thrust bearing as recited in claim 7, wherein said sealed valving area is formed by a portion of the seating surface for said race, said portion being defined by a circular groove having an O-ring disposed therein and having two ports flush with the seating surface within said O-ring, one port being in communication with a low pressure fluid discharge area and the other being in communication with said load cavity to permit discharge of pressurized fluid from said load cavity to said low pressure fluid discharge area when the bearing race is raised.

9. A hydrostatic axial thrust bearing as recited in claims 7 or 8, wherein springs are arranged in cavities formed in said support member below said race for floatingly supporting said race when the fluid pressure in said load cavity is within predetermined limits.

* * * * *